United States Patent
Chen

(10) Patent No.: US 7,764,577 B2
(45) Date of Patent: Jul. 27, 2010

(54) METHOD FOR PRE-CALIBRATING BALANCE GAIN OF ANALOG FRONT END IN OPTICAL DISK DRIVE TO CALIBRATE VARIATION OF FOCUS BALANCE

(75) Inventor: Der Jan Chen, Hsinchu (TW)

(73) Assignee: Sunext Technology Co., Ltd., Hsin-Chu (TW)

( * ) Notice: Subject to any disclaimer, the term of this patent is extended or adjusted under 35 U.S.C. 154(b) by 317 days.

(21) Appl. No.: 12/047,788

(22) Filed: Mar. 13, 2008

(65) Prior Publication Data

US 2008/0225655 A1    Sep. 18, 2008

(30) Foreign Application Priority Data

Mar. 14, 2007    (TW) .............................. 96108681 A

(51) Int. Cl.
*G11B 7/00* (2006.01)
(52) U.S. Cl. .................................. 369/44.35; 369/53.28
(58) Field of Classification Search ............. 369/44.26, 369/53.28, 44.34, 44.29, 44.35, 44.36, 53.24, 369/47.27

See application file for complete search history.

(56) References Cited

U.S. PATENT DOCUMENTS 7,352,666 B2 *    4/2008    Chen ....................... 369/44.35

* cited by examiner

*Primary Examiner*—Nabil Z Hindi
(74) *Attorney, Agent, or Firm*—Muncy, Geissler, Olds & Lowe, PLLC

(57) ABSTRACT

A method for pre-calibrating a balance gain of an analog front end in an optical disk drive to calibrate a variation of a focus balance. The method includes the steps of: adjusting the balance gain of the focus balance; moving a lens and getting an S curve; and comparing a positive half cycle of the S curve with a negative half cycle of the S curve. When the positive half cycle is equal to the negative half cycle, it represents that the balance gain of the focus balance is optimized and the procedure ends; or otherwise the above-mentioned steps are repeated to adjust the balance gain of the focus balance again. Because the balance gain is pre-calibrated, the optimal power calibration, the successful disk-reading possibility, the write-in quality and the stability of the disk judging mechanism can be enhanced and the consistency and the stability of the product can be improved.

8 Claims, 6 Drawing Sheets

METHOD FOR PRE-CALIBRATING BALANCE GAIN OF ANALOG FRONT END IN OPTICAL DISK DRIVE TO CALIBRATE VARIATION OF FOCUS BALANCE

CROSS REFERENCE TO RELATED APPLICATION

This application claims the benefit of the filing date of Taiwan Application Ser. No. 096108681, filed on Mar. 14, 2007, the content of which is incorporated herein by reference.

BACKGROUND OF THE INVENTION

1. Field of Invention

The invention relates to a method of focus balance calibration, and more particularly to a method for pre-calibrating a balance gain of an analog front end by way of offline calibration.

2. Description of the Related Art

In the prior art, the frequently used focus balance calibration performs the compensation according to level balanced displacement amount (Focus Balance DAC) on the focus balance but without the consideration of a balance gain of an analog front end. So, this method is not stable enough and cannot compensate for the larger variation. FIG. 1 is a schematic illustration showing shapes of light beams projected onto an optical head according to the prior art, wherein state 1 shows the shape of the light beam before compensation, and state 3 shows the shape of the light beam after a level balanced displacement amount on the focus balance is compensated. As shown in the state 1 of FIG. 1, when each optical pickup and a circuit board and a thickness of a disk material make the focus balance have the larger variation, it cannot be simply compensated according to the level balanced displacement amount on the focus balance, and only the compensated result of the state 3 of FIG. 1 can be obtained.

Therefore, if the focus balance gains A, B, C and D of the analog front end can be further adjusted to compensate for the influence of the focus balance caused by the optical pickup and the circuit board, then the optimal power calibration (OPC), the successful disk-reading possibility, the write-in quality and the stability of the disk judging mechanism can be enhanced, and the consistency and the stability of the product can be improved.

SUMMARY OF THE INVENTION

It is therefore an object of the invention to provide a method for pre-calibrating balance gains A, B, C and D of an analog front end in an offline manner.

To achieve the above-identified object, a method for pre-calibrating a balance gain of an analog front end in an optical disk drive to calibrate a variation of a focus balance is provided. The method includes the steps of: adjusting a balance gain of the focus balance; moving a lens and getting an S curve; and comparing an absolute value of a positive half cycle of the S curve with an absolute value of a negative half cycle of the S curve, wherein when the absolute value of the positive half cycle of the S curve is equal to the absolute value of the negative half cycle of the S curve, the balance gain of the focus balance is optimized and the step ends; or otherwise the balance gain of the focus balance is adjusted again.

Because the balance gain of the analog front end is pre-calibrated, the optimal power calibration, the successful disk-reading possibility, the write-in quality and the stability of the disk judging mechanism can be enhanced, and the consistency and the stability of the product can be improved.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

The method for calibrating a balance gain of an analog front end will be described in the following.

Figure 1:
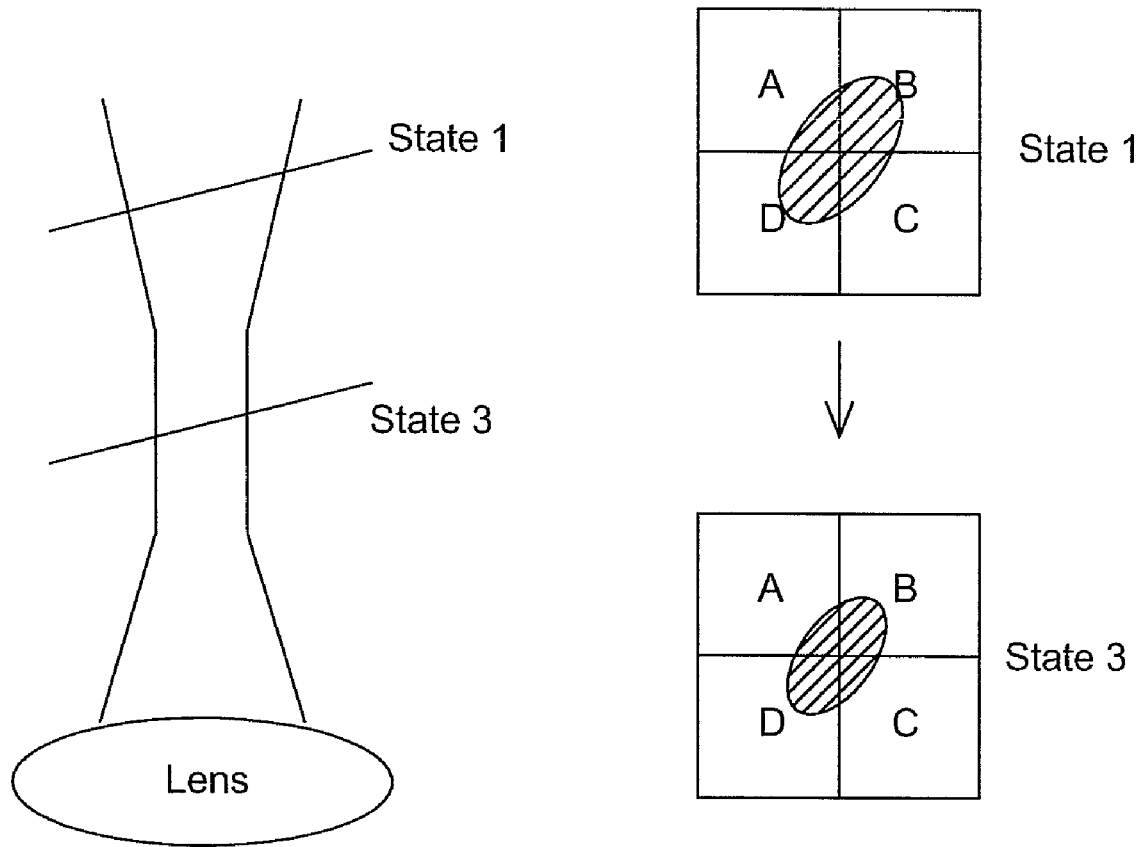
FIG. 1 is a schematic illustration showing shapes of light beams projected onto an optical head according to the prior art, wherein state 1 shows the shape of the light beam before compensation, and state 3 shows the shape of the light beam after a level balanced displacement amount on a focus balance is compensated.
Figure 2:
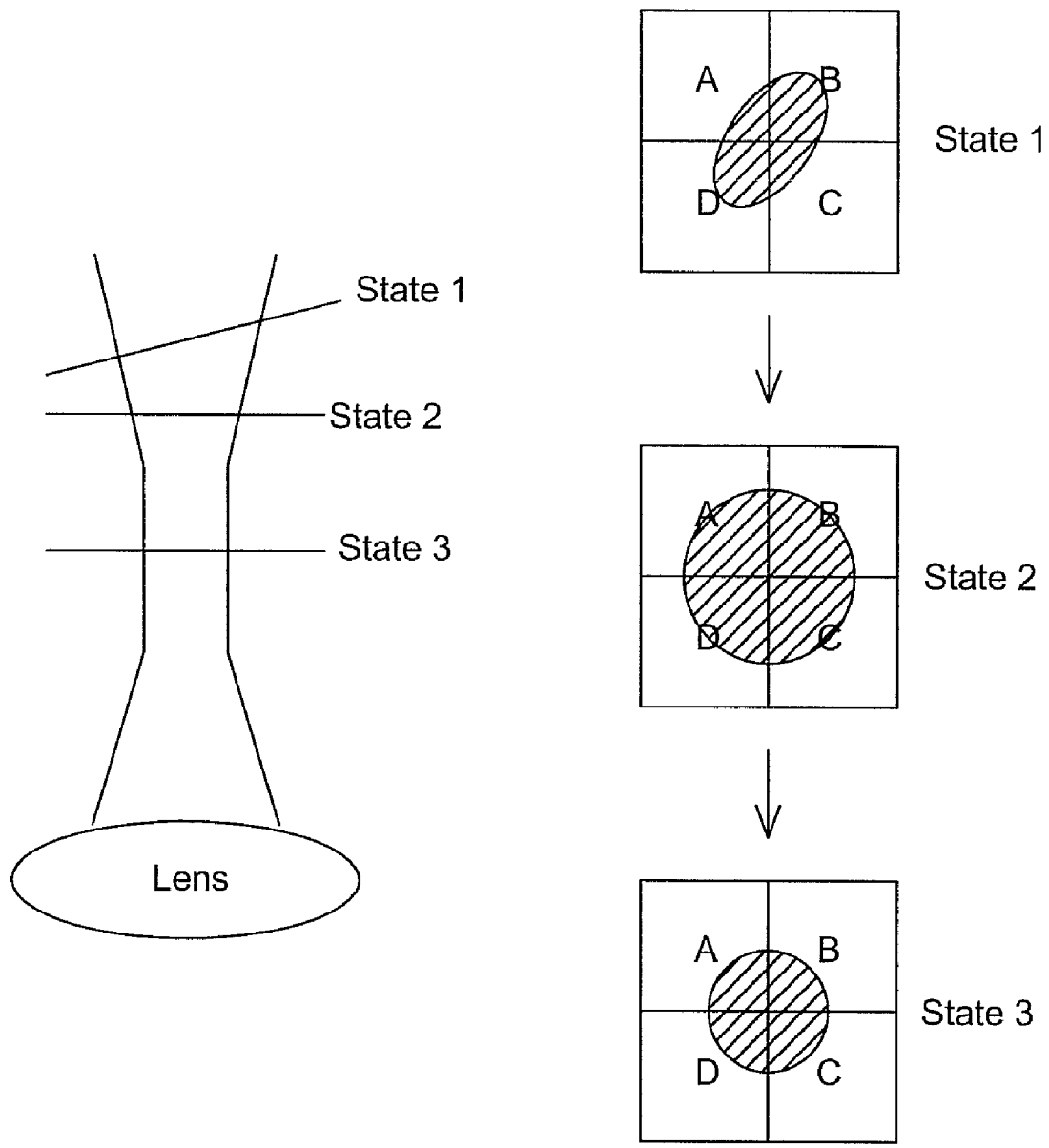
FIG. 2 is a schematic illustration showing shapes of light beams projected onto an optical head according to the invention, wherein state 1 shows the shape of the light beam before compensation, state 2 shows the shape of the light beam after balance gains A, B, C and D of an optical pickup is calibrated in an offline manner, and state 3 shows the shape of the light beam after the level balanced displacement amount on a focus balance is compensated.

FIG. 2 is a schematic illustration showing shapes of light beams projected onto an optical head according to the invention, wherein state 1 shows the shape of the light beam before compensation, state 2 shows the shape of the light beam after balance gains A, B, C and D of an optical pickup is calibrated in an offline manner, and state 3 shows the shape of the light beam after the level balanced displacement amount on a focus balance is compensated. When a circuit board or an optical path causes the variation of the focus balance, the shape of the laser beam impinging on the optical pickup is a non-circular shape, as shown in the state 1 of FIG. 2. In this state, the optimal state cannot be obtained by way of adjusting if only the conventional focus balance calibration is used, and only the result of the state 3 of FIG. 1 can be obtained by way of calibrating. Thus, the invention compensates for the variations of the focus balances caused by each optical pickup and the circuit board and the thickness of the disk material in a multiplex manner according to the balance gains A, B, C and D of the analog front end (AFE) in the optical pickup and the focus balance level displacement amount in a digital signal processor (DSP). After the balance gain adjustment is performed, the shape of the laser beam impinging on the optical pickup is a circular shape, as shown in the state 2 of FIG. 2. Thereafter, the optimal state, as shown in the shape of the state 3 of FIG. 2, can be obtained by way of adjusting according to the method for compensating the level balanced displacement amount on the conventional focus balance.

The invention provides a dual calibration method including an offline calibration method and an online calibration method to compensate for the variation of the focus balance and thus to effectively program the disk start-up time. According to this compensation method, it is possible to enhance the optimal power calibration, the successful disk-reading possibility, the write-in quality, the stability of the disk judging mechanism, and the consistency and the stability of the product.

Figure 3A:
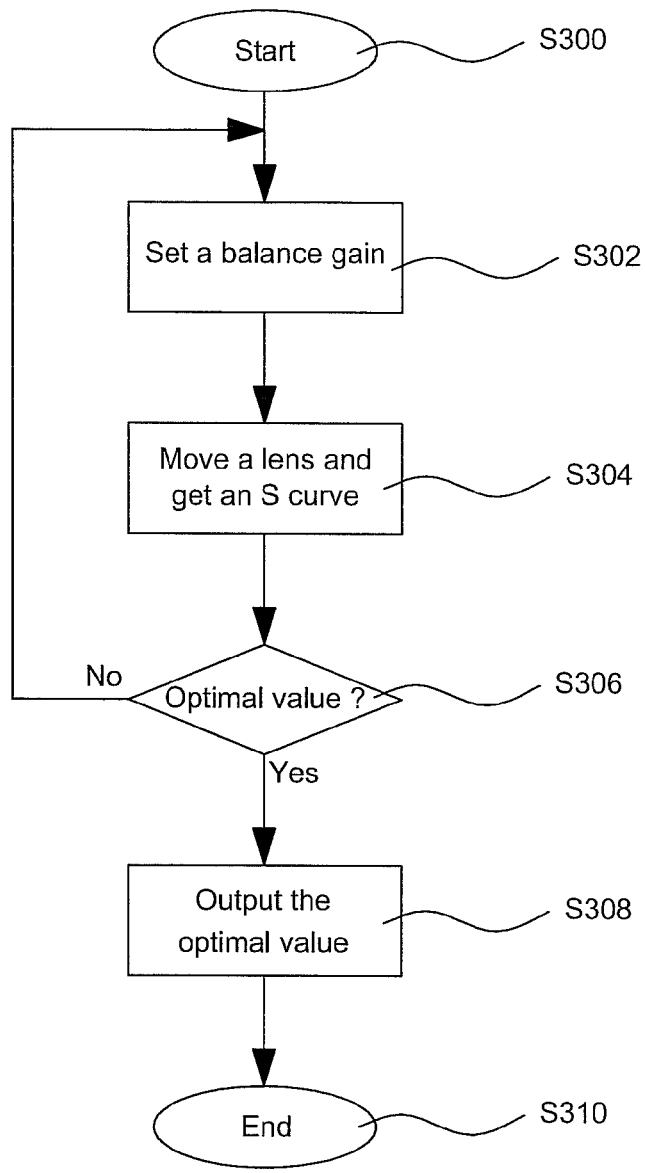
FIG. 3A is a flow chart showing the balance gains A, B, C and D of the optical pickup in the offline-calibrated analog front end according to a first embodiment of the invention.

FIG. 3A is a flow chart showing the balance gains A, B, C and D of the optical pickup in the offline-calibrated analog front end according to a first embodiment of the invention. The method of this embodiment is to adjust the balance gains A, B, C and D to make an S curve of the focus balance be symmetrical so that the upper and lower half cycles of the S curve are equal to each other.

In step S302, the focus balance gains A, B, C and D are adjusted. That is, the focus balance gains A, B, C and D are individually increased or decreased to compensate for the variation of the focus balance caused by the circuit board or the optical path.

Figure 3B:
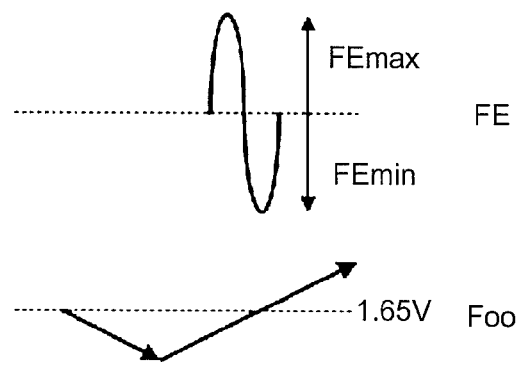
FIG. 3B shows an S curve and a driving voltage for moving a lens.

In step S304, a lens is moved and the S curve is got. As shown in FIG. 3B, the upper portion shows the S curve and the lower portion shows a driving voltage for moving the lens. While the lens is being moved, a maximum $FE_{max}$ and a minimum $FE_{min}$ of the S curve are also detected.

In step S306, it is determined whether an absolute value of a positive half cycle $FE_{max}$ of the S curve is equal to an absolute value of a negative half cycle $FE_{mim}$ of the S curve or not. If yes, it represents that the S curve has been optimized, and the procedure jumps to step S308; or otherwise the procedure jumps back to step S302.

In step S308, an optimal value is outputted to and stored in a memory of the optical disk drive, such as a flash ROM or an EEROM, so that the optimal value can be utilized at each time.

In step S310, the method ends.

For example, as shown in the state 1 of FIG. 2, if the focus balance gains A and C are increased or the focus balance gains B and D are decreased, the state 2 of FIG. 2 can be obtained by way of adjusting. The embodiment judges whether the focus balance gains A, B, C and D have been adjusted and optimized according to the symmetrical property of the S curve.

Figure 4A:
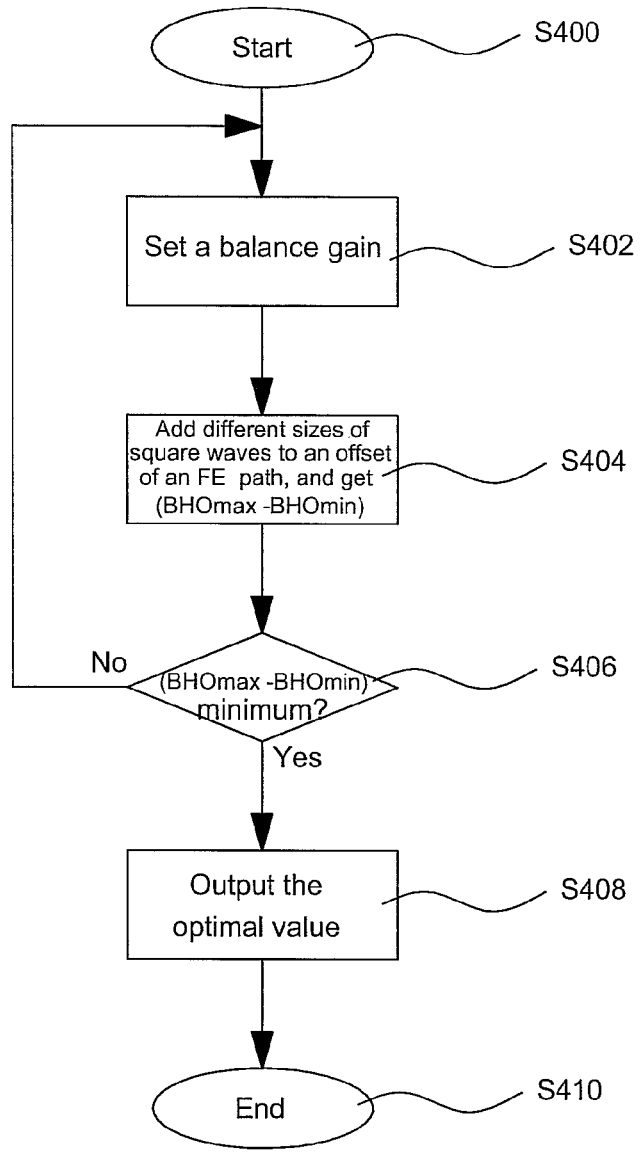
FIG. 4A is a flow chart showing the balance gains A, B, C and D of the optical pickup in the offline-calibrated analog front end according to a second embodiment of the invention.

FIG. 4A is a flow chart showing the balance gains A, B, C and D of the optical pickup in the offline calibrated analog front end according to a second embodiment of the invention. The method of the embodiment is to adjust the focus balance gains A, B, C and D to make a difference between an absolute value of $BHO_{max}$ and an absolute value of $BHO_{min}$ reach a minimum.

In step S402, the focus balance gains A, B, C and D are adjusted. That is, the focus balance gains A, B, C and D are individually increased or decreased to compensate for the variation of the focus balance caused by the circuit board or the optical path.

Figure 4B:
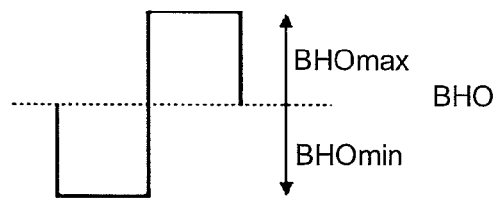
FIG. 4B shows a BHO curve and a driving voltage including an offset of an FE (Front End) path.
Figure 4B:

In step S404, a square wave is added to the offset of the FE path and a bottom curve (BHO curve) of a radio frequency (RF) signal is got. The so-called BHO curve is the bottom curve of the RF signal, which is obtained when the RF signal enters a peak-bottom hold block. As shown in FIG. 4B, the upper portion shows the BHO curve and the lower portion shows the driving voltage containing the offset of the FE path. While the offset of the FE path is being added to the driving voltage, the maximum $BHO_{max}$ and the minimum $BHO_{min}$ of the BHO curve are detected.

In step S406, it is determined whether the difference between the absolute value of the maximum $BHO_{max}$ of the BHO curve and the absolute value of the minimum $BHO_{min}$ of the BHO curve reaches a minimum or not. If yes, it represents that the BHO curve has been optimized, and the procedure jumps to step S408; or otherwise jumps back to the step S402.

In step S408, an optimal value is got and outputted to the memory of the optical disk drive, such as a flash ROM or an EEROM, so that the optimal value can be used at each time.

In step S410, the method ends.

This embodiment judges whether the focus balance gains A, B, C and D are adjusted and optimized according to the symmetrical property of the BHO curve.

Figure 5A:
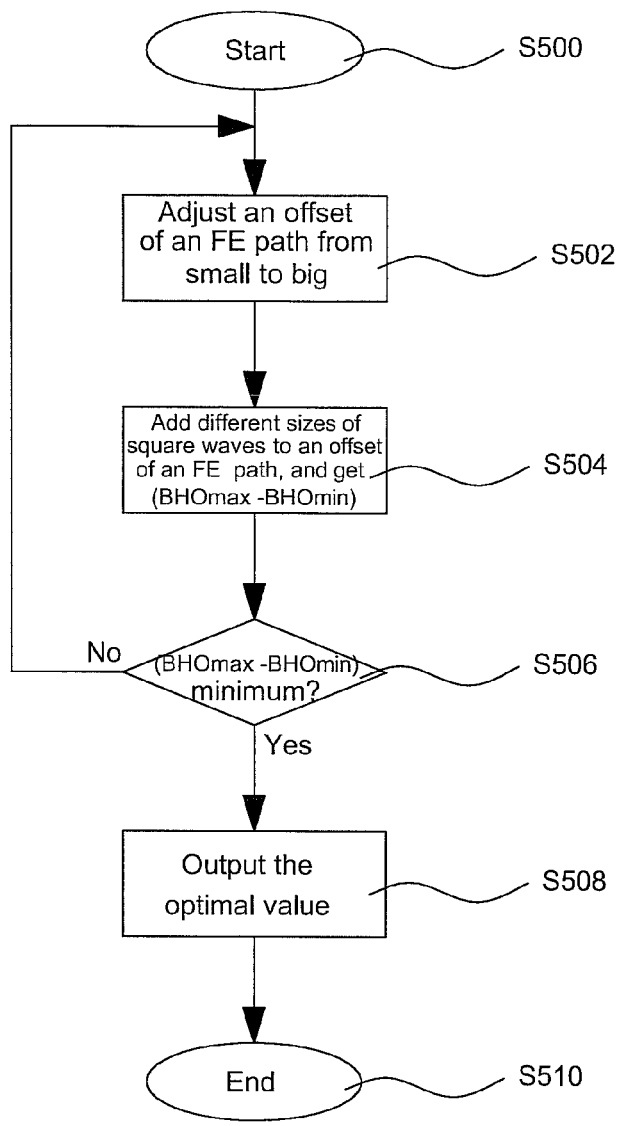
FIG. 5A is a flow chart showing an online calibrating method according to the invention.

FIG. 5A is a flow chart showing a method of on-line calibrating the offset of the FE path according to the invention. The method of this embodiment is to make the difference between the absolute value of $BHO_{max}$ and the absolute value of $BHO_{min}$ reach the minimum to serve as an optimal value according to the offset of the FE path.

In step S502, the offset of the FE path is adjusted.

Figure 5B:
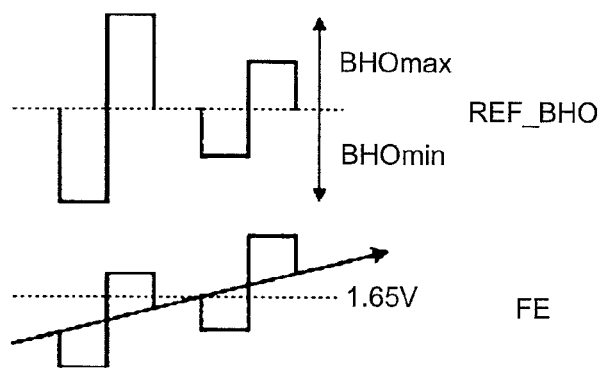
FIG. 5B shows an REF_BHO curve and a driving voltage including the offset of the FE path.

In step S504, a square wave is added to the offset of the FE path and the BHO curve is got. As shown in FIG. 5B, the upper portion shows the REF_BHO curve and the lower portion shows the driving voltage containing the offset of the FE path. While the offset of the FE path is being added to the driving voltage, the maximum $BHO_{max}$ and the minimum $BHO_{min}$ of the BHO curve are also simultaneously detected.

In step S506, it is determined whether the difference between the absolute value of the maximum $BHO_{max}$ of the BHO curve and the absolute value of the minimum $BHO_{min}$ of the BHO curve reaches a minimum or not. If yes, it represents that the BHO curve has been optimized, and the procedure jumps to step S508; or otherwise the procedure jumps to step S502.

In step S508, the optimal value is got and is used in the actual reading and writing processes.

In step S510, the method ends.

This embodiment is to judge whether the offset of the FE path has been adjusted and optimized according to the symmetrical property of the BHO curve.

Figure 6:
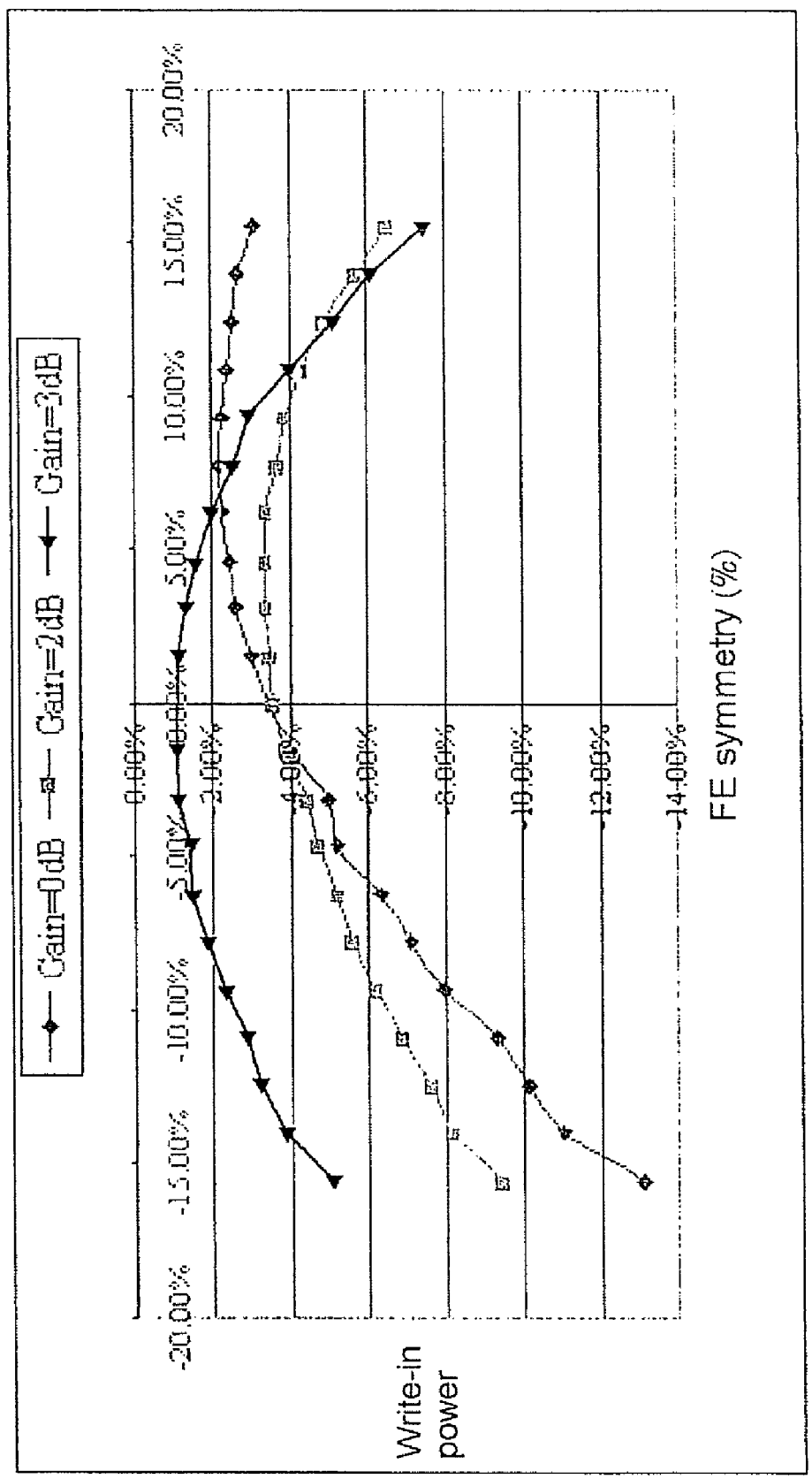
FIG. 6 shows a relationship between a write-in power and a variation tolerance of a focus balance under different focus balance gains A, B, C and D of the optical head, wherein the vertical axis represents the write-in power and the horizontal axis represents the percentage of the variation tolerance of the focus balance.

FIG. 6 shows a relationship between a write-in power and a focus balance gain under different focus balance gains A, B, C and D of the optical head, wherein the vertical axis represents the write-in power and the horizontal axis represents the percentage of the focus balance gain. As shown in FIG. 6, when the suitable focus balance gains A, B, C and D are obtained, the efficiency of the write-in power can be enhanced and the larger variation tolerance of the focus balance can be obtained.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A method for pre-calibrating a balance gain of an analog front end in an optical disk drive to calibrate a variation of a focus balance, the method comprising the steps of:

adjusting a balance gain of the focus balance;

moving a lens and getting an S curve; and comparing an absolute value of a positive half cycle of the S curve with an absolute value of a negative half cycle of the S curve, wherein when the absolute value of the positive half cycle of the S curve is equal to the absolute value of the negative half cycle of the S curve, the balance gain of the focus balance is optimized; or otherwise the balance gain of the focus balance is adjusted again.

2. The method according to claim 1, wherein the step of adjusting the balance gain of the focus balance comprises:

increasing or decreasing focus balance gains A, B, C and D to compensate for the variation of the focus balance caused by a circuit board or an optical path.

3. The method according to claim 1 being performed in an offline manner.

4. A method for pre-calibrating a balance gain of an analog front end in an optical disk drive to calibrate a variation of a focus balance, the method comprising the steps of:

adjusting a balance gain of the focus balance;

adding a square wave to an offset of an FE (Front End) path, and getting a BHO curve;

detecting a maximum of the BHO curve and a minimum of the BHO curve; and determining whether a difference between an absolute value of the maximum and an absolute value of the minimum of the BHO curve reaches a minimum, wherein:

when the difference between the absolute value of the maximum and the absolute value of the minimum of the BHO curve reaches the minimum, the balance gain of the focus balance is optimized; or otherwise the balance gain of the focus balance is adjusted again.

5. The method according to claim 4, wherein the step of adjusting the balance gain of the focus balance comprises:

increasing or decreasing focus balance gains A, B, C and D to compensate for the variation of the focus balance caused by a circuit board or an optical path.

6. The method according to claim 4 being performed in an offline manner.

7. A method for adjusting an offset of an FE (Front End) path, the method comprising the steps of:

adjusting the offset of the FE path;

adding a square wave to the offset of the FE path while detecting a maximum and a minimum of a BHO curve; and determining whether a difference between an absolute value of the maximum and an absolute value of the minimum of the BHO curve reaches a minimum, wherein:

when the difference between the absolute value of the maximum and the absolute value of the minimum of the BHO curve reaches the minimum, the method is optimized; or otherwise the offset of the FE path is adjusted again.

8. The method according to claim 7 being performed in an online manner.

* * * * *